United States Patent
Grenot

(10) Patent No.: US 6,853,619 B1
(45) Date of Patent: Feb. 8, 2005

(54) SYSTEM AND METHOD FOR MEASURING THE TRANSFER DURATIONS AND LOSS RATES IN HIGH VOLUME TELECOMMUNICATION NETWORKS

(75) Inventor: Thierry Grenot, Clamart (FR)

(73) Assignee: Ipanema Technologies (FR)

( * ) Notice: Subject to any disclaimer, the term of this patent is extended or adjusted under 35 U.S.C. 154(b) by 0 days.

(21) Appl. No.: 09/914,335

(22) PCT Filed: Feb. 9, 2000

(86) PCT No.: PCT/FR00/00311

§ 371 (c)(1),
(2), (4) Date: Dec. 27, 2001

(87) PCT Pub. No.: WO00/51292

PCT Pub. Date: Aug. 31, 2000

(30) Foreign Application Priority Data

Feb. 26, 1999 (FR) .............................. 99 02399
May 12, 1999 (FR) .............................. 99 06115

(51) Int. Cl.[7] .......................... G01R 31/08; H04L 12/28; G06F 15/173
(52) U.S. Cl. ....................... 370/232; 370/233; 370/235; 370/400; 709/224
(58) Field of Search ................................ 370/229, 230, 370/231, 232, 235, 400, 351, 352, 250, 247, 251, 252, 253, 412; 209/224, 223, 228, 220, 219, 235, 238

(56) References Cited

U.S. PATENT DOCUMENTS

| | | | | |
|---|---|---|---|---|
| 5,042,027 A | * | 8/1991 | Takase et al. ................ | 370/252 |
| 5,521,907 A | * | 5/1996 | Ennis, Jr. et al. ........... | 370/253 |
| 5,535,193 A | * | 7/1996 | Zhang et al. ................ | 370/253 |
| 5,701,302 A | * | 12/1997 | Geiger ........................ | 370/521 |
| 5,886,643 A | * | 3/1999 | Diebboll et al. ............. | 370/245 |
| 6,144,961 A | * | 11/2000 | De La Salle .................. | 707/10 |
| 6,308,211 B1 | * | 10/2001 | Rosborough et al. ....... | 709/224 |
| 6,321,264 B1 | * | 11/2001 | Fletcher et al. ............. | 709/224 |
| 6,327,620 B1 | * | 12/2001 | Tams .......................... | 709/224 |

\* cited by examiner

*Primary Examiner*—Hanh Nguyen
(74) *Attorney, Agent, or Firm*—Bachman & LaPointe, P.C.

(57) ABSTRACT

The invention relates to a system and non-intrusive method for measuring loss rates and transfer durations for data flows that are sent by a telecommunication network in packet mode. The inventive method is characterized in that it comprises the following steps: classification of the data packet in a homogeneous flow; calculation of an identification signature for each data packet; counting of the packets in the flow; measurement of unidirectional transfer times per flow or information flow group and measurement of the loss rate for said packets.

25 Claims, 8 Drawing Sheets

SYSTEM AND METHOD FOR MEASURING THE TRANSFER DURATIONS AND LOSS RATES IN HIGH VOLUME TELECOMMUNICATION NETWORKS

The present invention relates to a non-intrusive method for measuring the loss rates and transfer durations for data in a telecommunication network in packet mode.

The invention is particularly adapted to high volume networks that are operated in non-connected mode. It relates also to a distributed architecture system comprising a plurality of flow observation probes arranged in several points in the network, and means for transmitting these measurements to a collecting module which is connected to storage means and means for analyzing the measurements that have been provided.

Packet mode telecommunication networks are characterized in that transmitted information are conveyed in groups referred to as packets, that are substantially made up of one header which contains information for sending a packet through the network as well as data to be transmitted. Such packets are conveyed through the network, and travel, in accordance to what suits the best the latter, through the most diversified transmitting and switching means.

An exemplary packet mode network is the Internet network which is operated with IP protocol (Internet Protocol). As a few examples of transmitting and switching means related to the IP protocol, ISDN (integrated services digital network), FR (Frame Relay), ATM (Asynchronous Transfer Mode), SDH (Synchronous Digital Hierarchy), SONET (Synchronous Optical network), DWDM (Dense Wavelength Digital Multiplexing) networks, etc., can be found.

Packets are typically transmitted from a large number of sources operating independently with one another, towards a large number of recipients that operate independently with one another as well.

Since the transmission timing of packets and the length of every packet are not accurately defined by the network itself, it is difficult for the network operator and users to guarantee and even estimate the transfer duration and the loss rate (likelihood that one packet will not reach the intended destination). Therefore, it would be very useful to carry out accurate measurements on real data pertaining to useful packets, so that administration, configuration, and planning of a packet mode network can be made possible. Good knowledge of these characteristics would facilitate equally the implementation of services with In differentiated and guaranteed quality, as opposed to a best effort type service.

One conventional solution to achieve such a result is to make use of one or more sources that send test packets, referred to as "ping" in an IP network. Each test packet is recognized by its recipient and is sent back by the latter to the corresponding source. This source is able then to carry out measurements, such as the round-trip transmission duration. Statistical processing is also possible based on measurements performed on a large number of packets; for instance, to estimate the characteristics of the round-trip transfer durations (maximum, minimum, mean, median, etc . . . ).

Another solution that is used consists in providing part of sources and recipients with a sufficiently accurate knowledge of a common time reference. Sources produce test packets and take notice of the starting time. Recipients take notice of the reception time for these test packets. Then, calculations are carried out as to characterize, for example, the transfer durations and loss rates.

However, with the above-mentioned solutions it is not possible to achieve a good accuracy on every occasion. Actually, the number of test packets has to remain small for neither overloading the network, nor using too many devices. Hence, statistical estimates might carry a high degree of inaccuracy. Besides this, packet mode networks often do not feature identical characteristics on the way out and the way back paths, between two access points. Moreover, the devices for the packet mode network (such as routers and switchers) analyze frequently the packet contents (for example, the transport protocol from end to end, the data type, the type of file which is contained in the packet, etc . . . ), in order to infer therefrom a process for transmitting the packet, the queue, or the priority, etc . . . Consequently, test packets might not follow the same path as do the packets which contain real data for network users. This results in a high degree of uncertainty about the measurement of transfer duration of packets containing real data for network users.

From the U.S. Pat. No. 5,521,907, another solution is also known, which permits measurement in a non-intrusive way between two points in a known network. However, that solution is strictly limited to networks in connected mode, such as frame relay, and therefore, cannot be used in non-connected mode networks, nor high volume networks. Further, with that method, analysis of packet losses is not possible.

Moreover, from the U.S. Pat. No. 5,535,193, a solution which permits determination of the passage time of the packets by a plurality of synchronized network analyzers. However, this solution makes use of a separate connection for controlling the synchronization, and requires thus the analyzers to be close with one another.

The present invention aims to alleviate the above-mentioned drawbacks.

To this end, one object of the invention is to provide a method and a system with a distributed architecture that allow to measure accurately the transfer durations and loss rates for telecommunication networks in packet mode. The method comprises the steps for performing the measurement operations by a plurality of observing probes that are synchronized and distributed at different points in the network, on data packets which are transmitted through the network, the measurement operations comprising the dating and the identification of the data packets, the measurement results being transmitted from the probes to the collecting module.

The method according to the invention is characterized in that the measurement operations further comprise a classification of the data packets in a homogenous flow, and a counting of the packets in the flow, the measurement results being transmitted from the probes to the collecting module through the network (1), the collecting module performing a correlation between all of the measurement results received from the probes, including the determination of the unidirectional transfer durations per flow or information flow group, and of the loss rate for the packets.

The method according to the invention is advantageous in that it does not require the use of test packets, which permits the achievement of a very wide representativeness of every measurement. It is also advantageous in that a large number of measurements can be carried out, resulting in a high degree of statistical accuracy. Finally, the number of measurements being carried out can be modulated in accordance with the types of data conveyed within the packets, authorizing a rational use of the resources which are available in the system.

Besides this, classification of the data packets in a homogenous flow makes possible:

to refine the measurement (per destination, per application type, . . . );

to index the reference space for signatures, to minimize thereby double signature likelihood, and to ease incoming flow/outgoing flow correlations.

Another advantage offered by the classification of the data packets in a homogenous flow is that a signature with a small length can be kept while having a low probability of ambiguity resulting from similar signatures appended to different packets. This is effective to ease strongly the system operation on the wide network.

In practice, the flow is determined from the network addresses (which define the paths), the transport addresses and the optional elements that enable the network to select the service quality to be applied. Alternatives are possible, for example, to bring together IP addresses into sub-network corresponding to a single destination. In the case where an Internet network is used, source and destination IP addresses could be selected, as well as, either the ToS (type of service) field, or the TCP/UDP source and destination ports. Other clusters may be employed without departing from the scope of the invention.

The counting of the packet in the flow is used to determine packet losses in the network. The size of the counter depends of the implementation, nevertheless remaining at a reasonable level by using the fact related to a given flow. Ongoing implementations can be satisfactorily achieved with counters having a 8–32 bits width.

The method according to the invention enables equally an accurate measurement of the losses of packets in the network, operating such a network with numerous points giving access to the observed area, while maintaining a simplified structure. It is also applicable to point-to-multipoint flows.

Advantageously, the signature which identifies the packet shows the three following characteristics:

it is kept in the network, at any measurement point. When determining it, this will result in ignoring fields that correspond to the physical layers and the network layers having a level lower than the layer at which operates the system;

its length is small compared to the mean length of the packets. This allows to limit the amount of information to supply the collector with;

the likelihood that two different packets have the same signature for a given flow is low. This allows to limit the number of disabled measurements.

According to another important characteristic of the invention, the method comprises a filtering step and a semi-static sampling step for classes obtained during the classification step.

In this case, only a part of the packet combinations belonging to a given class will be retained. The sampling rate depends typically of the class, and will not theoretically change dynamically. For instance, it may be desirable to keep all of the combinations of packets conveying voice, and only a part of those that convey computer files.

Further, each class can be submitted to a dynamic sampling with a rate which depends of the congestion conditions in the system.

A multiplicity of criteria may be used so that the overall operation could take place automatically in an area that suits the best the device administrator, for instance, with the highest sampling rate for a given maximum network flow rate, or a minimum network flow rate for a given sampling rate.

With the sampling mechanism, the method according to the invention enables an observation of extremely high volume networks and a diminution of flows brought back from the probes to the collector as well as a dynamic optimization of the measurement characteristics, which authorizes an adaptive optimization in accordance with the operating conditions of the system.

According to an important characteristic of the invention, the measurement of the transfer durations and the counting of the packet are synchronized as a function of an absolute time reference gained by the measuring probes that are distributed through the network.

With the absolute time reference, it is possible to obtain loss rates and transfer durations in each communication direction. For example, according to the accuracy and the cost which are required, the absolute time reference can be gained through GPS devices, radio broadcasting, network protocols.

Noting the absolute time of the passage of the packet (time stamping) will be used to calculate transfer durations between two probes. For instance, in the case where an Internet network is used, an accuracy of about 100 $\mu$s may be selected.

The system for implementing the method according to the invention is characterized in that each probe further comprises means for classifying the data packets in a homogenous flow, means for identifying each packet, means for counting the packets in one flow, the transmitting means of the probes using the network to transmit the measurements carried out to the collecting module, the collecting module comprising means for determining the unidirectional transfer durations per flow or information flow group and the loss rate for the packets.

Other characteristics and advantages of the invention will be more fully understood from the following description to be considered as a non-limitative example while referring to the appended drawings, in which.

Figure 1:
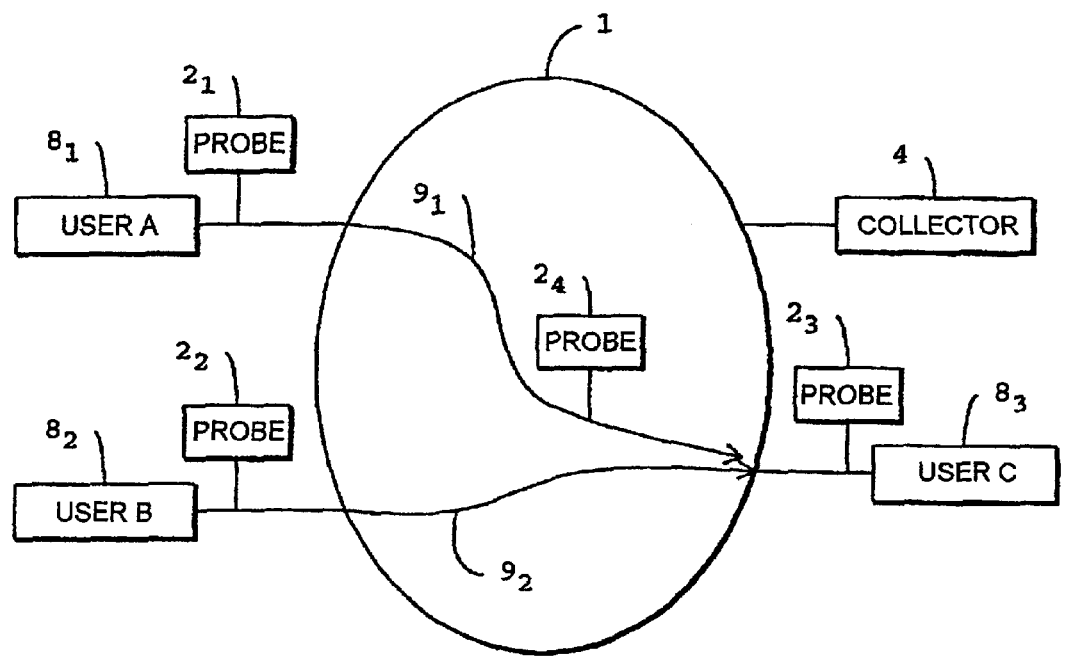
FIG. 1 shows schematically an exemplary embodiment of the invention in a telecommunication network in packet mode

In FIG. 1, there is shown schematically a high volume network 1 that is operated in non-connected mode, such as a network based on IP protocol (Internet Protocol). A plurality of flow-observing probes $2_i$ are arranged at different points in the network for carrying out measurements on flows of data that are exchanged through this network. Means for compressing these measurements are provided in probes $2_i$ as well as means for transmitting them to a collecting module 4. The latter acts to collect and correlate the elementary measurements that were carried out by the observing probes $2_i$.

Figure 2:
FIG. 2 shows a functional diagram of a system implementing a method according to the invention.

As it can be seen from FIG. 2, said collecting module 4 is connected to storage means 5 that communicate with means 6 for analyzing measurements that were performed.

Thereafter, results of these analyses are sent to an operating module 7. Those different modules may be, either dissociated physically, or partially or entirely provided in one or more common physical equipment.

The method according to the invention is characterized substantially by
- a step for classifying the data packets in a homogenous flow
- a step for calculating an identification signature for each packet;
- a step for counting the packets in the flow
- a step for measuring the unidirectional transfer durations per flow or information flow group and the loss rate for the packets.

Respective order of these steps may be changed according to the different requirements put on when implementing.

As it is depicted in FIG. 1, users $8_1$, $8_2$ and $8_3$ are connected to the network 1. Observing probes $2_1$ and $2_4$ have access to packets $9_1$ originated from $8_1$, the probe $2_2$ has access to packets originated from $8_2$, the probe $2_3$ has access to packets received by $8_3$. The collecting module 4 is connected to the network 1 and behaves as a user of this network 1, communicating through this network with the probes $2_1$, $2_2$, $2_3$, and $2_4$, which are users of the network 1 as well. These probes $2_1$, $2_2$, $2_3$, and $2_4$ carry out measurement operations for each packet they have access to. These measurements consist in performing dating, classification and identification of the packets, as well as compressing these measurements. Every probe $2_i$ transmits, through the network 1, the compressed measurements to the collecting module 4 that correlates all of these measurements.

Other embodiments are also possible in the scope of the present invention, notably in the following cases:
- the users $8_i$ are not necessarily end users for information being conveyed within the packets; for instance, they may represent local networks or other networks in packet mode;
- the probes $2i$ can be connected to the collecting module 4 through means other than the network 1; for instance, through another telecommunication network, or through a local storage medium that stores data from the collecting module 4, sending them back to it later on;
- the same collecting module 4 can be connected to several collecting modules 4;
- several collecting modules 4 can communicate to build up correlations between measurement elements they have.

Figure 3:
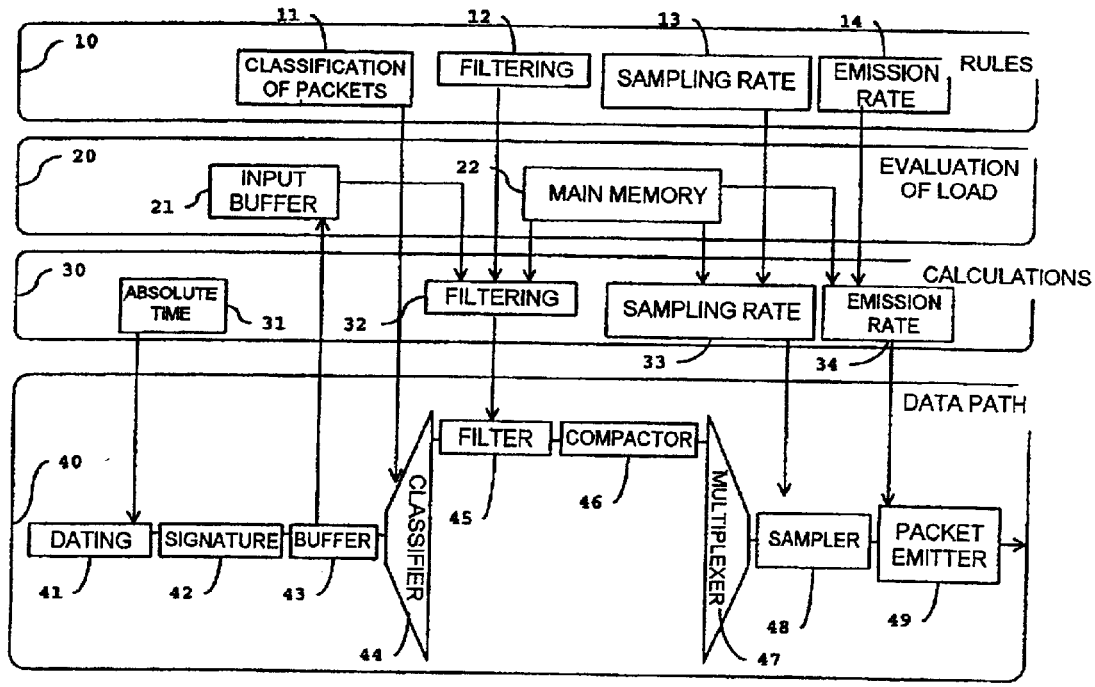
FIG. 3 depicts schematically an example of an internal functional organization for a system according to the invention.
Figure 4:
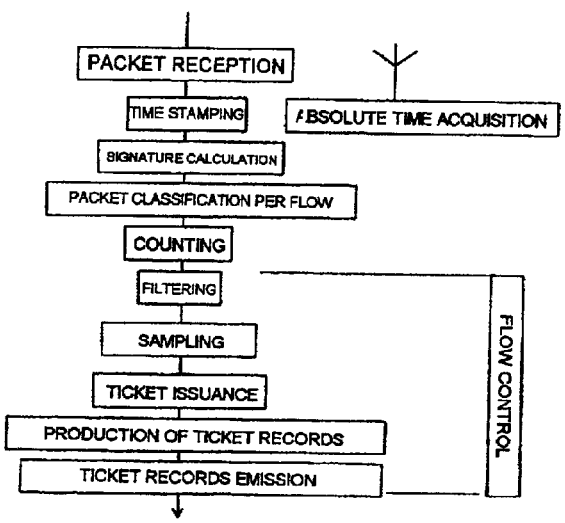
FIG. 4 shows a functional diagram depicting the operation of an observing probe used in a system according to the invention.

As an example, a possible functional diagram of the system according to the invention is shown in FIG. 3. Four functional groups can be found therein
- the rule group 10, with the rules being fixed statically or semi-statically (for example by the system operator);
- the load evaluation group 20, measuring the load rate on the local central processing unit, the memory occupancy, etc . . . ;
- the calculation group 30, evaluating dynamically the values relating to compaction, sampling, etc . . . ;
- the data path group 40, producing records that contain combinations (class, date, signature) for each packet.

When activated, the probes $2_i$ gain a common time reference 31. The inaccuracy of this reference between two probes $2_i$ affects directly the accuracy of the result for the whole device. Means for gaining that time reference can be diversified as well as multiple; as non-limitative examples, GPS (Global Positioning System), broadcasting through radio waves, high stability drivers, NTP (Network Time Protocol) and SNTP (Simple Network Time Protocol) protocols may be mentioned;

- each packet is subjected to dating 41 using the absolute time reference when it is observed by a probe $2i$. The latter is able to date, either the start of the packet, or the end of the packet, or any other criterion.
- each packet is subjected to the calculation of the signature 42, that is for representing it later on. The signature enables to reduce the amount of information which is needed to identify the packet. That signature results typically from a binary polynomial calculation (for instance, CRC calculation—cyclic redundancy check—on 16 or 32 bit elements). The signature calculation is performed either on the whole packet or on a part of it, in accordance to what is contemplated in relation with the structure and the variability of the contents of the packets in the network. The signature has to be small compared to the mean packet size, so as to ease its storage, its transmission and its subsequent processing. It must be capable of assuming different values to make negligible the likelihood that two different packets have the same signature. As an example, it can be considered that one signature on 16 bit elements enables to identify about 256 different packets with a low likelihood of ambiguity;
- each packet is subjected to a classification operation 44. Criteria for classification are typically those that are conventionally retained to identify flows between networks and sub-networks (such as IP network sub-addresses), flows between end equipment (such as IP addresses), flows between applications (such as IP addresses and UDP/TCP transport addresses), etc . . . Each packet is then identified by combining all or part of the elements: class, date, signature;
- each class can be subjected to filtering 45; i.e., the probes $2_i$ do not store the combinations (class, date, signature) for packets belonging to one of the classes for which the filter has been provided;
- each class can be subjected to a compaction or a semi-static sampling operation 46. In this case, only a part of the combinations (class, date, signature) for packets belonging to a given class will be retained. The sampling rate depends typically of the class, and will not theoretically change dynamically. For instance, it may be desirable to keep all of the combinations of packets conveying voice, and only a part of those conveying computer files.
- each class can be subjected to a dynamic sampling with a rate which depends of the congestion conditions in the system: measurement of the occupancy of buffers 21 and memories 22 of the probes $2_i$, transmission flow rates towards the collecting module 4, network load, load of the collecting module 4, etc . . . A multiplicity of criteria can be used so that the overall operation can take place automatically in an area that suits the best the device administrator. For instance, the highest sampling rate for a given maximum flow rate of a flow brought back from the probe to the collector, or a minimum flow rate of a flow brought back to the collector for a given sampling rate
- a counter is associated with each combination (class, date, signature) that is retained, indicating the number of packets observed in the flow. The collecting module 4 is then capable to measure the loss rate in the network by comparing between the counters associated with the same packets at different points in the network.

The filtering and static and dynamic sampling operations allow to reduce the amount of combinations (class, date, signature) to be stored et processed. The provision or removal of filters, the values of the semi-static sampling rates, the parameterization the dynamic sampling, etc . . . , can be achieved, for instance, through an administrative operation performed from one of the collecting modules 4 or operating modules 7.

Sampling criteria can be diversified. As examples, periodical sampling which consists in keeping one combination every N combinations, statistical sampling that depends on drawing a random variable of which statistical characteristics are under control, and sampling on signature that consists in keeping only those combinations of which the signatures belong to a given set of values can be mentioned.

The sequence order through which a probe $2_i$ performs the above-mentioned operations may change. A probe $2_i$ can classify the packets before dating them, as long as the measurement accuracy is not altered to a great extent. In the same way, the filtering operations can be performed at different instants during the process.

Figure 5:
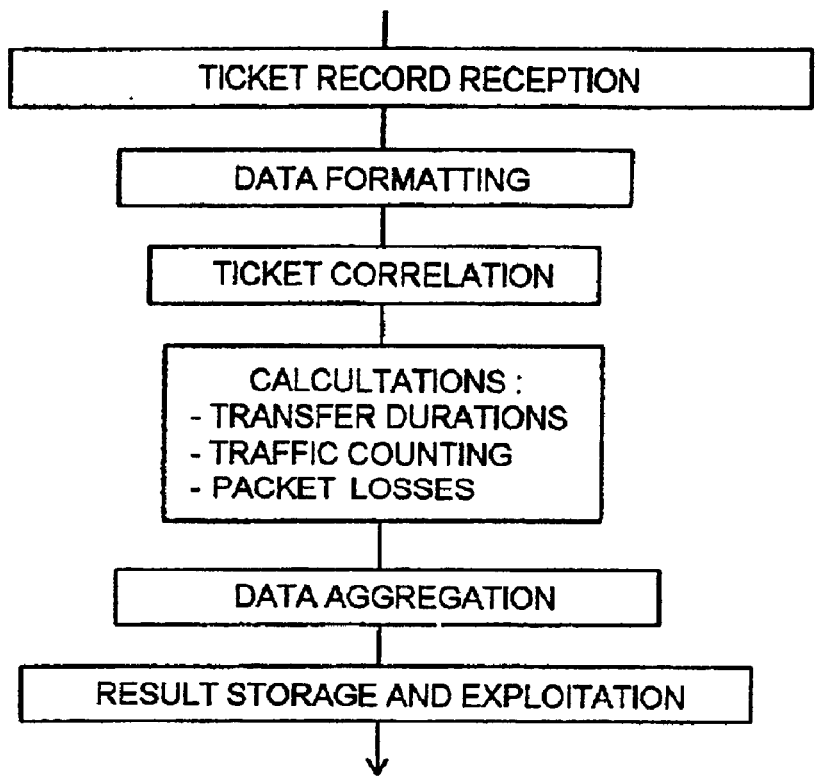
FIG. 5 shows a functional diagram depicting the operation of a collecting module used in a system according to the invention

FIG. 5 depicts the steps for collecting and correlating the measurements by a collecting module 4.

The latter receives samples of the non-filtered combinations (class, date, signature) originating from all of the observing probes $2_1$ attached therewith;

- each packet is theoretically seen by two observing probes $2i$: the first time when entering the network, the second time when leaving. However, other situations may occur. For instance, one packet might be seen only once if the supervision domain is not closed, or more than twice if there are observing probes $2i$ within the network;
- each time a packet has been observed by an observing probe $2_i$ as passing by, one combination. (class, date, signature) is received by the collecting module 4, except when filtering, sampling or loss of return message, etc . . . , is taking place;
- the collecting module 4 correlates the combinations (class, date, signature) for the same packet, for instance by comparing between the signatures and by increasing the transit delays in the network;
- in case of success, it infers from above, through a simple arithmetical calculation, on one hand, the transfer duration between the different observing probes $2i$ for the packet in question and, on the other hand, the number of packets that were possibly lost in the network. Moreover, a number of packets in excess at the exit enables to indicate that a fault in one of the network devices or an intrusion attempt has occurred. More sophisticated calculations, such as mean, minimum, maximum, median, etc . . . , values for a given time slot and a certain flow type, can also be achieved in the collecting module 4 prior to the storage operation in the storage module 5.

The selection of one set of consistent criteria for the filtering and the static and dynamic sampling that are applicable to all of the observing probes $2_i$ attached to a collecting module 4 facilitates the correlation operations the latter has to perform, and enhances the successful correlation ratio.

According to an alternative of the method, it may happen that measuring certain flows is not desirable. In this case, corresponding measurements are filtered, which prevents undue loads on the probes $2_i$ to be generated.

For each packet, one ticket is issued and typically comprises 3 parts: the packet passage time, the packet signature, and the value of the counter associated with the flow (absolute value, or number of packets since the last ticket was issued). For a given flow, tickets are brought together in a common structure before their transmission to the collecting module 4. This clustering operation allows to factorize long elements (flow identifier), and thereby to reduce the overall amount of information to be sent up to the collecting module 4. A transmission of ticket records towards said collecting module 4 is occurring, for instance, if the maximum record length has been reached, or off-time, when, for a given flow, the probes $2_i$ do not observe packet passing by any longer.

An important advantage of the method according to the invention derives from the fact that flows of ticket records between the probes and the collecting module 4 remain small compared to the amount of measured flows. This enables notably the supervision of large size networks, and possibly the use of the network being supervised itself for sending information between the probes $2_i$ and the collecting modules 4.

That reduction is achieved notably by the fact that tickets feature a relatively small size compared to the mean size of the observed packets as this was mentioned here above, and thanks to the sampling of the measured packets, which is effective to limit the number of tickets transmitted to the collecting module 4.

That sampling consists, within one flow, and therefore after classification, in selecting the packets which will cause a ticket to be transmitted. Those tickets which are not selected are simply counted. The sampling criteria may be modified, however in order that the collecting module 4 be able to perform subsequent input/output correlations, it is important they should be common to all of the probes $2_i$ in the same collecting module 4. Actually, if this was not the case, the likelihood to have a ticket both at the entry and at the exit of the observation domain would be very low for the same packet, and thus the successful correlation ratio would be very low as well. Further, these criteria must be relevant to the binary contents of the packets, which constitutes the sole "absolute" information that is provided on principle.

Criteria and parameters that are possibly associated may be different for each flow. A sampling that suits each type of flow is made possible. For instance, in the case where an Internet network is used, it is possible to provide a higher sampling rate for packets conveying voice (mean compression, high accuracy), while a lower rate will be devoted to data packets (high compression, mean accuracy).

Based on packet signature analysis, one exemplary criterion can be retained: the packets, the signatures of which are multiple of a given value, will be sampled. Of course, any other appropriate arithmetical expression can be used without departing from the scope of the invention.

It is to be noted that sampling do not reduce the counting accuracy. This is equally true when packets are lost, that otherwise would have cause tickets to be issued. Actually, the counter that is associated with every ticket produced yields the total number of packets since the last sampled ticket. The only consequence is a loss of accuracy as for the precise instant at which the loss occurred and the exact identity of the packet that was lost. Both characteristics are of little usefulness a priori, thus being not much looked after. However, as the sampling characteristics are attached to a certain flow, it is always possible not to sample the flows for which detailed information are desirable. For those flows, all of the packets will cause one ticket to be issued. Moreover, as the number of measurements is lower than the number of packets, statistical laws will be applicable, that are well known as for the validity and the accuracy of the measurements which are applied to the sample thus captured.

Therefore, the method according to the invention enables to achieve flow control at the probe level in order:

- to protect the collecting module 4 against an overload: (too many tickets to be processed relatively to its own resources that are the available processing power and the memory size, . . . );
- to protect the probes 2i against an overload: (too many tickets to be processed relatively to its own resources that are the available processing power and the memory size, . . . );
- to protect the network used to transmit ticket records from the probe to the collector;
- to adapt to changes in the capacity of the network used to transmit ticket records from the probes 2i to the collecting module 4;
- to enable an optimum distribution of the measurement resource between the different flows in case of congestion;
- to optimize the pair (measurement accuracy/network load) in accordance with combined criteria, in normal operation.

To control the flow, the following functions may be used, separately or in combination:

- limitation of the overall flow through the network to a maximum value due to the transmission of ticket records from the probes 2i to the collecting module 4. That limit can, either be defined by an initial configuration, or be modulated by the collecting module 4 or by an external device operating the network;
- limitation of the sampling rate to a maximum value. That limit can, either be defined by an initial configuration, or be provided by the collecting module 4 or by an external device operating the network. In addition, it may differ for each type of flow or flow group;
- reduction of the sampling rate. That reduction can, either be defined locally by observing the congestion of the probes 2i, or be fixed by the collecting module 4 or by an external device operating the network. That reduction may differ for each type of flow or flow group. The reduction law must allow the collecting module 4 to correlate records which were performed by probes 2i having not the same sampling value for a given flow, the reduction being not necessarily synchronous between the probes 2i. A principle which must be retained is the inclusion one; tickets of the "reduced" flows have to be included also in the tickets of the "lesser reduced" flows. In this way, tickets of the probe 2i having the highest reduction factor can always be correlated with tickets of the probe 2i having a lower reduction coefficient;
- modulation of the sampling rate in accordance with the local congestion state at the probe 2i, the characteristics of the tickets brought back to the collecting module 4, and the load distribution among the different types of flow. An object of that modulation is to secure the probes 2i operation through adaptation to instant load conditions of the different components in the system. It handles the evolution between a "bad" state corresponding to a low accuracy and a high produced traffic and an "excellent" state corresponding to a high accuracy and a low produced traffic. The evolution between the "bad" and "excellent" zones can be varied.

The main functions of the collecting module 4 are depicted in FIG. 5. The respective order of these functions can be changed according to the different requirements put on the implementation, without departing from the scope of the invention.

The formula here below are carried out by the calculation function of the collecting module 4 for a given flow F.

The notations being used are:

$D_{es}(p)$=Transfer duration from the entry point (e) to the exit point (s) for a packet (p).

Te(p)=Ticket associated with the packet (p) by the probe at the entry point.

Ts(p)=Ticket associated with the packet (p) by the probe at the exit point.

He(p)=Time stamping in the ticket associated with the packet (p) by the probe at the entry point.

Hs(p)=Time stamping in the ticket associated with the packet (p) by the probe at the exit point.

Ce(p)=Counter in the ticket associated with the packet (p) by the probe at the entry point.

Cs(p)=Counter in the ticket associated with the packet (p) by the probe at the exit point.

Ne(pq)=Number of packets between the passage of the packets p and q at the entry point.

Ns(pq)=Number of packets between the passage of the packets p and q at the exit point.

Pes(pq)=Number of packets lost between the passage of the packet p and the packet q.

The measurements of the transfer durations are carried out as follows:

For each pair of tickets (Ts(p); Te(p)) corresponding to the same packet (p) passing through the observed network, the transfer duration $D_{es}(p)$ can deduced simply from:

$$D_{es}(p)=Hs(p)-He(p)$$

Counting the packets is performed as follows:

let the pairs of tickets (Ts(p); Te(p)) and (Ts(q); Te(q)) corresponding to the packets (p) and (q) that belong to the same flow and pass through the observed network, and such that the ticket Ts(q) succeeds to the ticket Ts(p) for the probe 2i at the exit point.

The number Ns(pq) of packets between the passage of the packets p and q at the exit point can be deduced simply from the definition of the counter associated with the exit ticket $$Ns(pq)=Cs(q)$$

The number Ne(pq) of packets between the passage of the packets p and q at the entry point equals to the sum of the counters of the entry tickets as for the one associated with p (not included) and the one associated with q (included). This enables to take into account, for instance, the case where packets are lost, that otherwise would have cause one exit ticket to be issued:

$$Ne\ pq = \sum_{i=p+}^{i=q} Ce\ i$$

Counting the lost packets is performed as follows:

The number Pes(pq) of packets lost in the network between the pass system of the packets p and q then equals to:

$$Pes(pq)=Ne(pq)-Ns(pq)$$

Figure 6:
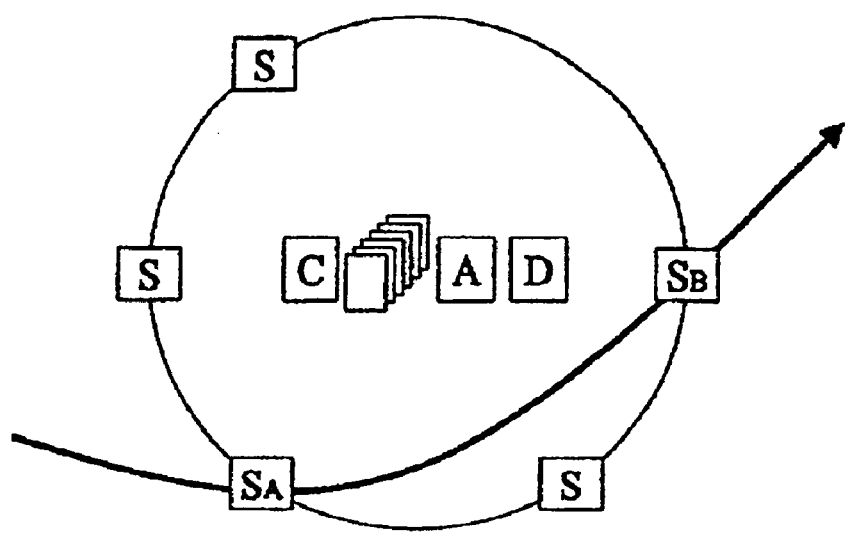
FIGS. 6 to 16 depict schematically the operation of a system according to the invention.
Figure 7:
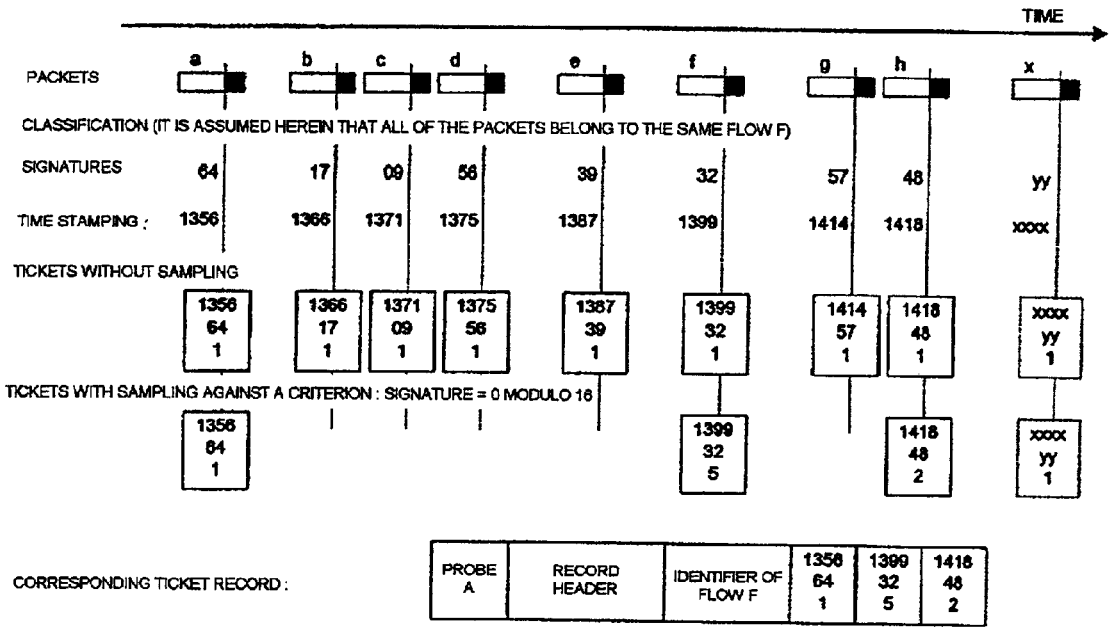
Figure 8:
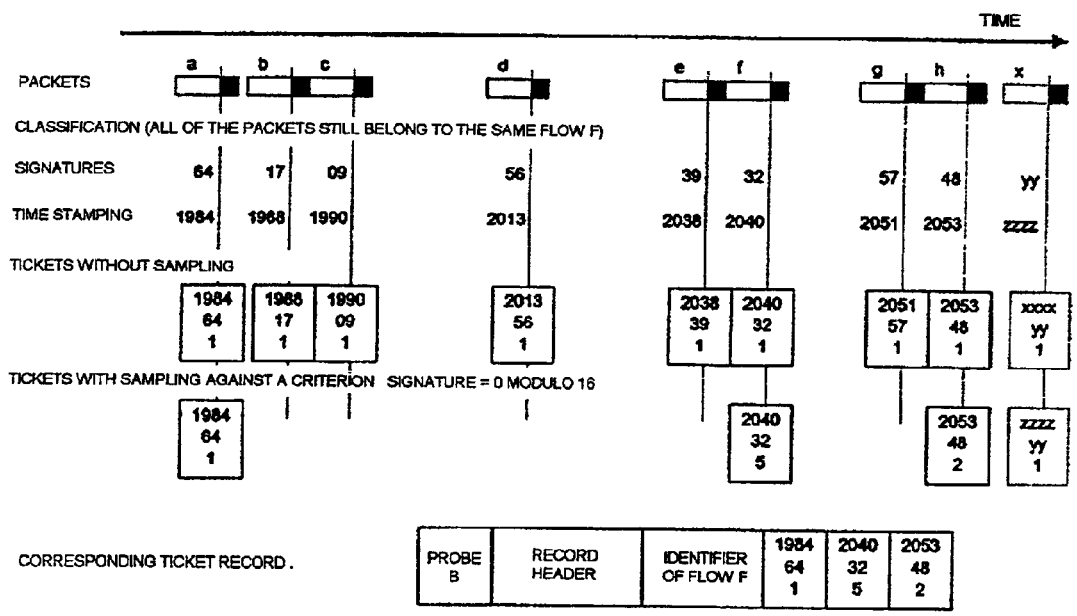
Figure 9:
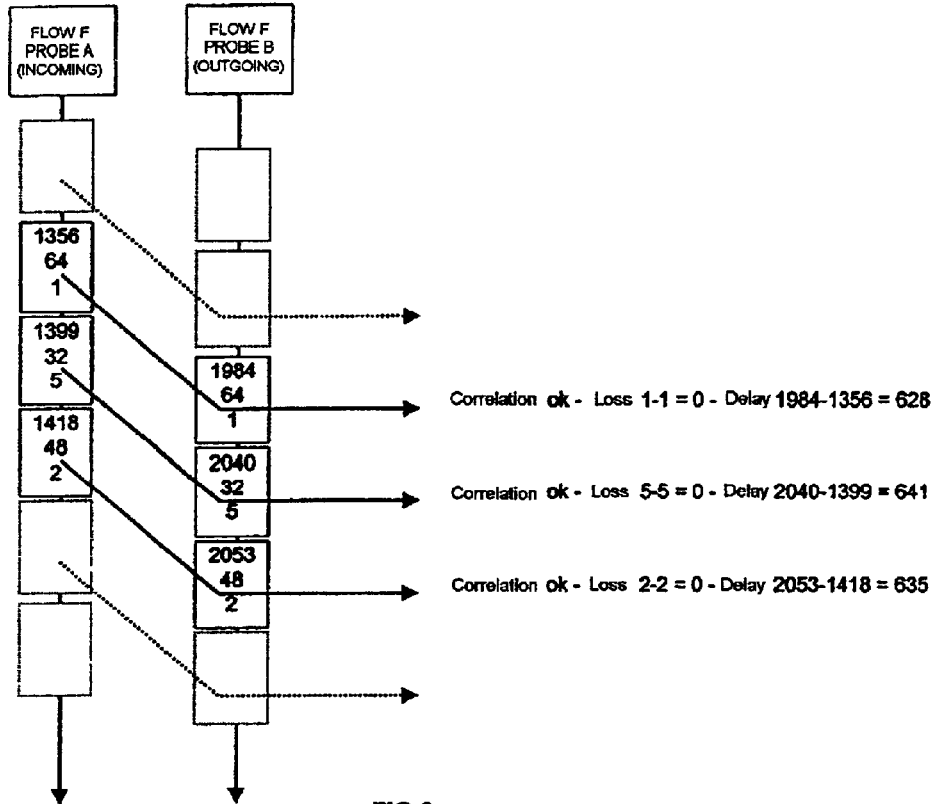
Figure 10:
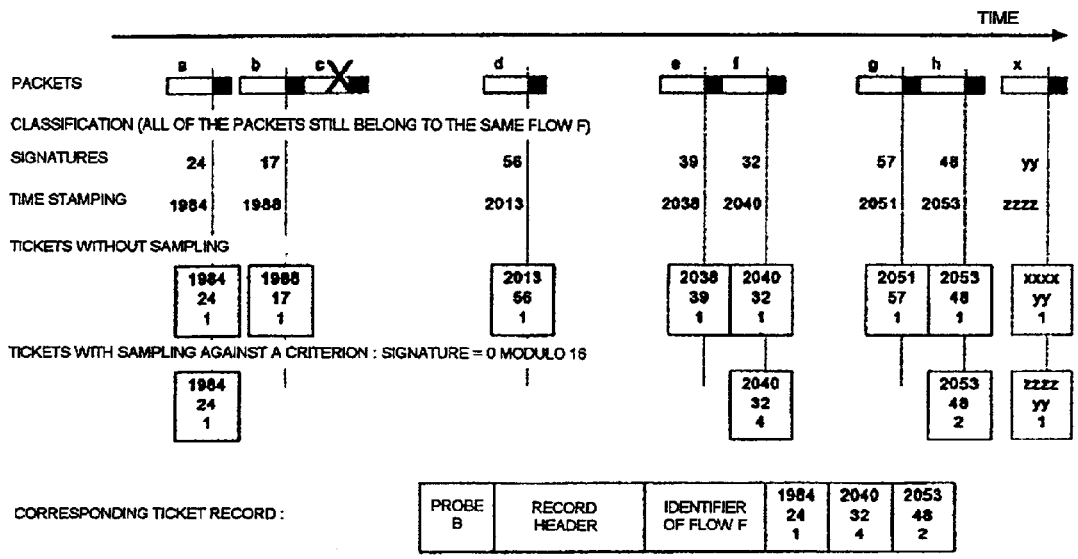
Figure 11:
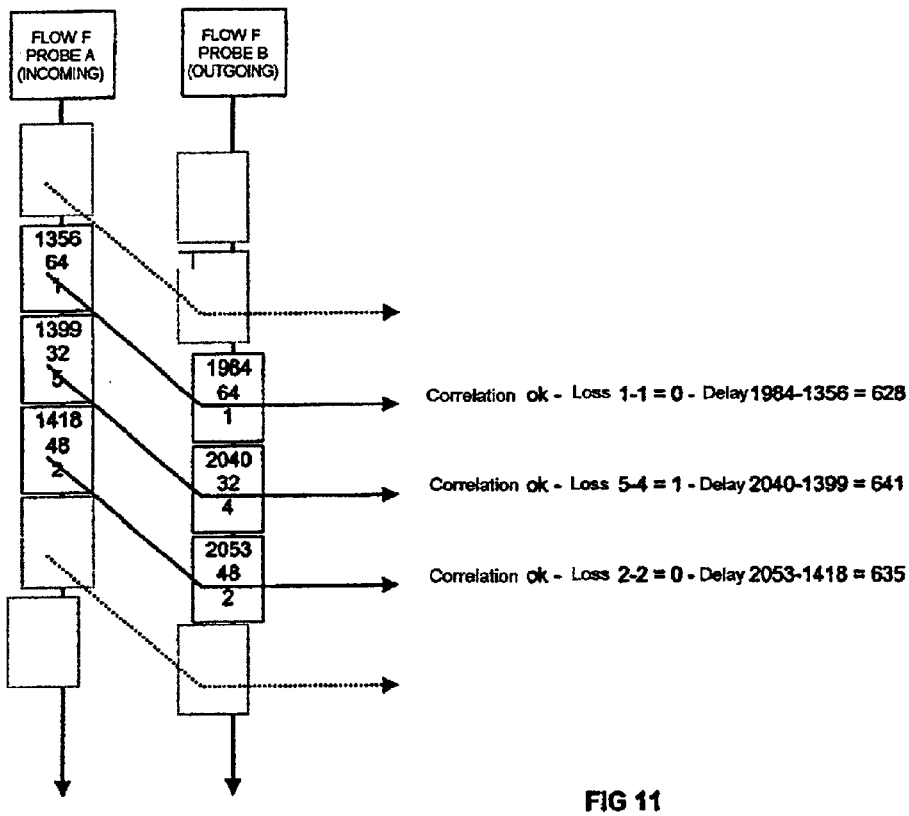
Figure 12:
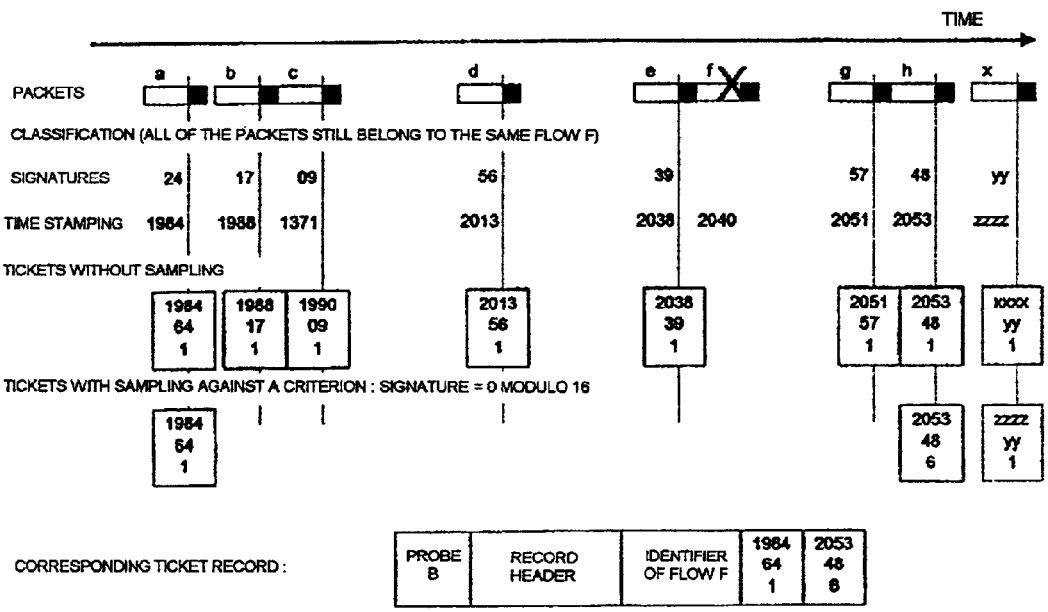
Figure 13:
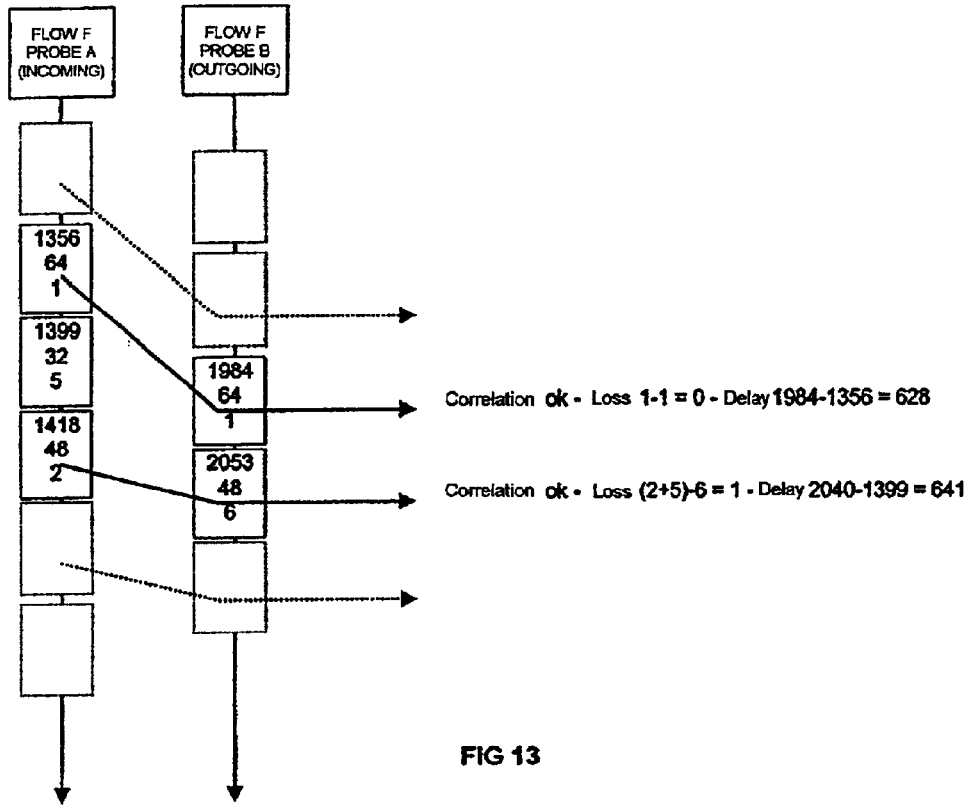
Figure 14:
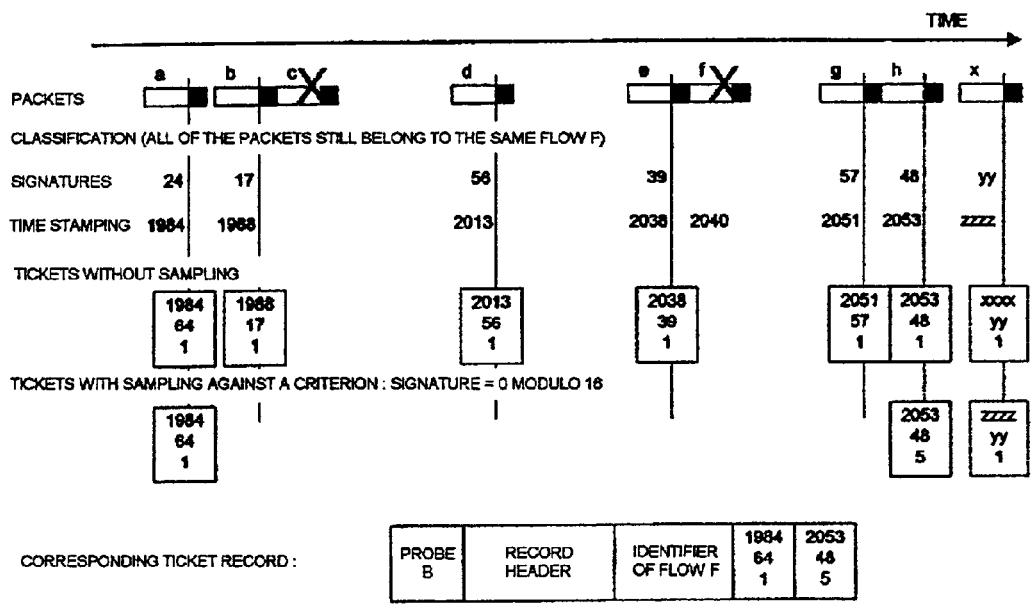
Figure 15:
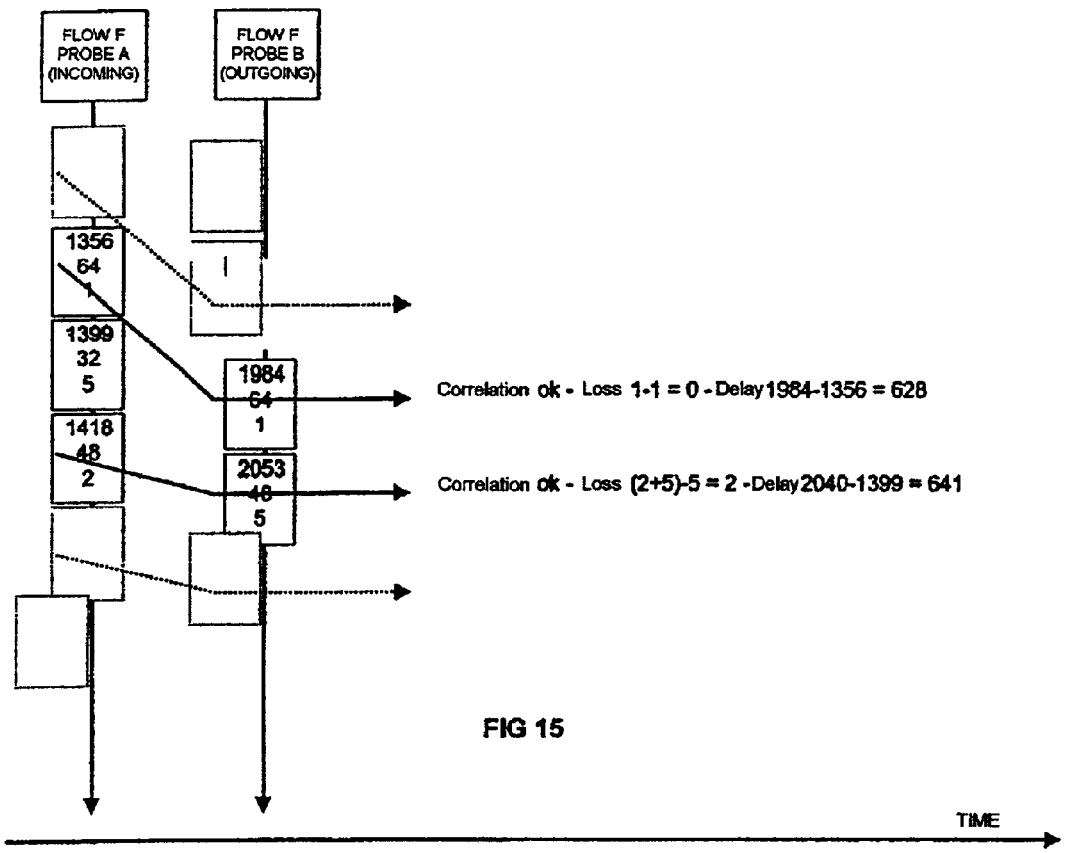

As an example of the implementation of the method according to the invention, FIG. 6 shows schematically an exemplary network in which the entry probe is $S_A$, and the exit probe is $S_B$. These probes are already synchronized and have a common time reference. The sampling criterion keeps packets of which the signature equals to 0 module 16. The signature has 2 digits, while time stamping has 4 digits. Time unit is not defined.

FIGS. 7 to 15 depict different cases where the same packet sequence at the entry is considered, giving rise to the same ticket sequence by the probe $S_A$.

Figure 16:
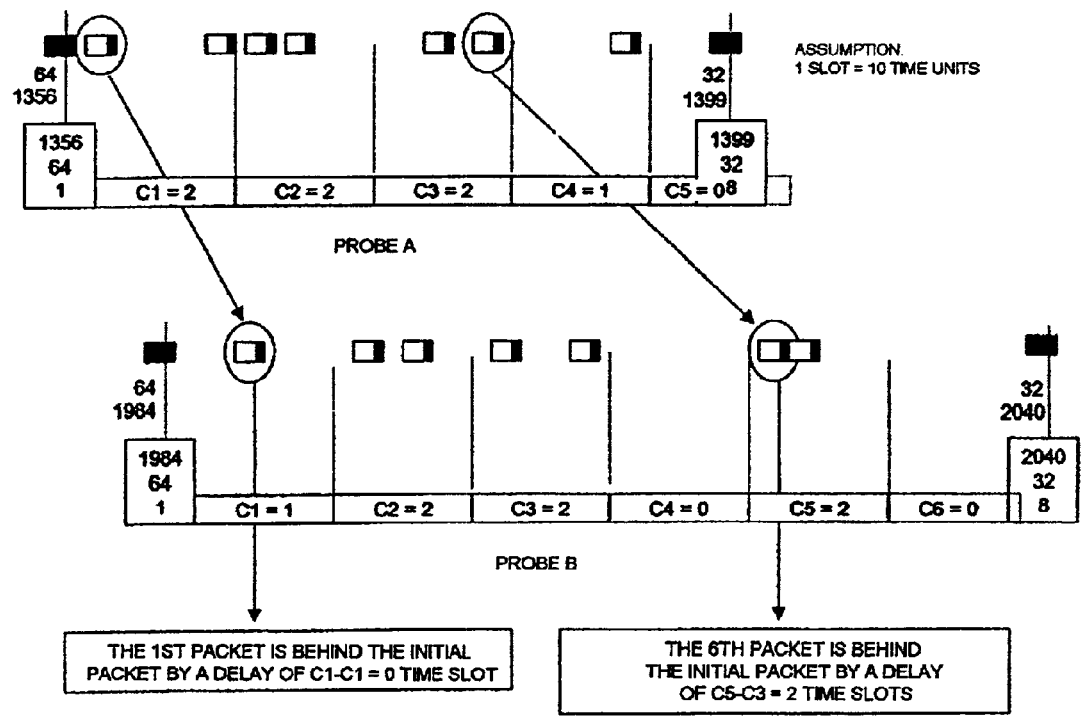

According to a particular embodiment of the invention as shown in FIG. 16, that is adapted to the case where the sampling rate is low, i.e. when numerous packets do not cause one ticket to be transmitted, for a given flow, time is broken down in slots, starting from the instant when an observed packet caused one last ticket to be issued. The size of the slot can be fixed locally at the probe or by the collector, and may change according to different criteria one counter is associated with each time slot;

for every packet passing by that does not cause one ticket to be issued, the counter associated with the corresponding time slot when the passage occurred is incremented;

and for the next packet passing by that causes one ticket to be issued, the list of counters thereby obtained is attached.

That mechanism enables the collecting module 4 to obtain, by comparing between the counters provided by the probes $2_i$ at the entry and at the exit, a measurement of the change in transfer durations for packets flowing between packets that cause tickets to be issued and that are subjected thus to an overall measurement. It is also assumed that packets belonging to the same flow do not become a pair, which is generally the case.

The accuracy obtained has a value of about the length of the time "slot" that was retained (compromise between the number of slots—thus of counters to be flowed up—and the accuracy).

It is to be noted that this mechanism can work out well but as long as the packet loss rate is null or low for the period of time which is considered.

The main advantages of this embodiment are the following:

refining the delay measurement: packets that did not cause one ticket to be issued still contribute to the measurement;

insensitivity to a rise in the number of packets observed: an increase in the number of packets observed will not actually result in an increase of the traffic flowing back from the probes $2i$ to the collecting module 4.

What is claimed is:

1. A non-intrusive method for measuring loss rates and transfer durations for data in a telecommunication network in packet mode comprising the steps of:

performing measurement operations with a plurality of observing probes that are synchronized and distributed at different points in the network on data packets which are being transmitted through the network;

said measuring operations comprising steps of dating and identifying the data packets, classifying the data packets in a homogeneous flow, counting the data packets in the homogeneous flow, and transmitting measurement results from said measurement operations from said probes to a collecting module through the network; and performing with the collecting module correlations between all of said measurement results received from the probes including determining unidirectional transfer durations per flow or information flow group and a loss rate for the data packets.

2. A non-intrusive method for measuring loss rates and transfer durations for data in a telecommunication network in packet mode comprising the steps of:

performing measurement operations with a plurality of observing probes that are synchronized and distributed at different points in the network on data packets which are being transmitted through the network;

said measurement operations comprising steps of subjecting each observed data packet to dating in accordance with an absolute time reference gained by the observing probes, identifying the data packets, classifying the data packets in a homogeneous flow, counting the data packets in the homogeneous flow, and transmitting measurement results from said measurement operations from said probes to a collecting module through the network; and performing with the collecting module correlations between all of said measurement results received from the probes including determining unidirectional transfer durations per flow or information flow group and the loss rate for the data packets.

3. The non-intrusive method according to claim 2, further comprising said identifying step comprising calculating an identification signature on packet contents for each said data packet.

4. The non-intrusive method according to claim 2, further comprising issuing one ticket comprising packet passage time, packet signature, and a value of a counter associated with the flow or the information flow group.

5. The non-intrusive method according to claim 2, wherein said classifying step comprises classifying each said data packet according to recipient characteristics of the respective data packet or according to a contents of the respective data packet.

6. The non-intrusive method according to claim 2, further comprising calculating the transfer durations at different sections in the network using a mapping operation of combinations which belong to one of said data packets that has been observed by several of said probes.

7. A non-intrusive method for measuring loss rates and transfer durations for data in a telecommunication network in packet mode comprising the steps of:

performing measurement operations with a plurality of observing probes that are synchronized and distributed at different points in the network on data packets which are being transmitted through the network;

said measurement operations comprising steps of subjecting each data packet to dating in accordance with an absolute time reference gained by the observing probes, identifying the data packets, classifying the data packets in a homogeneous flow, counting the data packets in the homogeneous flow, and transmitting all measurement results from said measurement operations from said probes to a collecting module through the network;

performing with the collecting module a correlation between all of said measurement results received from the probes including determining unidirectional transfer durations per flow or information flow group and the loss rate for the data packets;

performing a filtering step and a semi-static sampling step for classes obtained during the classifying step, said sampling step comprising selecting those data packets which will cause a ticket to be issued.

8. The non-intrusive method according to claim 7, further comprising a dynamic sampling step with a rate which depends on congestion conditions in the network.

9. The non-intrusive method according to claim 8, wherein said sampling step is performed with a sampling rate which can be limited to a maximum value that is defined by an initial configuration or be modulated by the collecting module or by an external device operating the network.

10. The non-intrusive method according to claim 7, wherein said sampling step is performed with a sampling rate which can be limited to a maximum value that is defined by an initial configuration or be modulated by the collecting module or by an external device operating the network.

11. A The non-intrusive method according to claim 10, wherein, in the case where the sampling rate is low, breaking down time in slots starting from an instant when an observed data packet causes one last ticket to be issued, fixing the size of each time slot locally at one of the probes or by the collecting module, associating one counter with each time slot, and, for every data packet passing by that does not cause one ticket to be issued, incrementing said one counter associated with a corresponding time slot when the passage occurred, and for the next packet passing by that causes one ticket to be issued, attaching a list of counters thereby obtained.

12. A non-intrusive method for measuring loss rates and transfer durations for data in a telecommunication network in packet mode comprising the steps of:
performing measurement operations with a plurality of observing probes that are synchronized and distributed at different points in the network on data packets which are being transmitted through the network;
said measurement operations comprising steps of dating and identifying the data packets, classifying the data packets in a homogeneous flow, counting the data packets in the homogeneous flow, and transmitting measurement results from said measurement operations from said probes to a collecting module through the network;
performing with the collecting module a correlation between all of said measurement results received from the probes including determining unidirectional transfer durations per flow or information flow group and the loss rate for the data packets;
wherein for a given flow, the transfer durations determining step is carried out as follows:

$$D_{es}(p) = Hs(p) - He(p)$$

where $D_{es}(p)$ is a transfer duration from an entry point (e) to an exit point (s) for a respective data packet (p); He(p) is a first time stamping in a ticket associated with the respective data packet (p) by one of said probes at the entry point; and Hs(p) is a second time stamping in the ticket associated with the respective data packet (p) by said one of said probes at the exit point.

13. A non-intrusive method for measuring loss rates and transfer durations for data in a telecommunication network in packet mode comprising the steps of:
performing measurement operations with a plurality of observing probes that are synchronized and distributed at different points in the network on data packets which are being transmitted through the network;
said measurement operations comprising steps of dating and identifying the data packets, classifying the data packets in a homogeneous flow, counting the data packets in the homogeneous flow, and transmitting measurement results from said measurement operations from said probes to a collecting module through the network;
performing with the collecting module a correlation between all of said measurement results received from the probes including determining unidirectional transfer durations per flow or information flow group and the loss rate for the data packets;
wherein, for a given flow, the loss rate determining step comprises calculating a number Pes(pq) of said data packets lost in the network between a passage of two data packets designated p and q according to the following formula:

$$Pes(pq) = Ne(pq) - Ns(pq)$$

where Ne(pq)=number of data packets between the passage of the packets p and q at an exit point; and Ns(pq)=number of packets between the passage of the packets p and q at an entry point.

14. A system with a distributed architecture for measuring non-intrusively loss rates and transfer durations for data in a telecommunication network in a packet mode, said system comprising:
a plurality of flow observing probes arranged in several locations in the network for observing data packets which are being transmitted through the network, each of said probes comprising means for subjecting each of said observed data packets to dating, means for classifying said data packets in a homogeneous flow, means for identifying each said data packet, and means for counting the data packets in one flow;
means for synchronizing said probes;
means for transmitting measurement results issued by said dating, identifying, classifying and counting means from said probes through said network to a collecting module comprising means for correlating said measurement results comprising means for determining from said measurement results unidirectional transfer durations per flow or information flow group and the loss rate for the data packets.

15. A The system according to claim 14, wherein the identifying means of each said probe comprises means for calculating an identification for each said data packet.

16. The system according to claim 14, wherein each said probe further comprises means for compressing the measurements before transmitting said measurements to the collecting module.

17. A system with a distributed architecture for measuring non-intrusively loss rates and transfer durations for data in a telecommunication network in a packet mode, said system comprising:
a plurality of flow observing probes arranged in several locations in the network for observing data packets which are being transmitted through the network, each of said probes comprising means for subjecting each observed data packet to dating in accordance with an absolute time reference gained by said observing probe, means for identifying each said data packet, means for classifying data packets in a homogeneous flow, and means for counting the data packets in one flow;
means for transmitting measurement results issued by said dating, identifying, classifying and counting means from said probes through said network to a collecting module comprising means for correlating said measurement results comprising means for determining from said measurement results unidirectional transfer durations per flow or information flow group and the loss rate for the data packets.

18. The system according to claim 17, wherein each of said probes further comprises means for calculating an identification signature on packet contents for each of said data packets in order to identify said data packets.

19. The system according to claim 17, wherein each of said probes further comprises means for issuing a ticket comprising packet passage time, packet signature, and a value of a counter associated with the flow or the information flow group.

20. The system according to claim 17, wherein each of said probes further comprises means for filtering said data packets and means for semi-static sampling classes issued by said classifying means, said sampling means comprising means for selecting those data packets which will cause a ticket to be issued.

21. The system according to claim 17, wherein each of said probes further comprises means for dynamic sampling said data packets with a rate depending on congestion conditions in the network.

22. The system according to claim 17, wherein said sampling means comprise means for performing said sampling with a sampling rate which can be limited to a maximum value that is defined by an initial configuration or be modulated by the collecting module or by an external device operating the network.

23. The system according to claim 17, wherein said sampling means comprise means for performing said sampling with a sampling rate which can be limited to a maximum value that is defined by an initial configuration or be modulated by the collecting module or by an external device operating the network.

24. The system according to claim 17, wherein said classifying means comprise means for classifying each said data packet according to recipient characteristics of the respective data packet or according to a contents of the respective data packet.

25. The system according to claim 17, wherein said transfer durations determining means comprise means for computing the transfer durations for a given flow F as follows:

$$D^{es}(P) = Hs(P) - He(p)$$

where $D_{es}(P)$ is a transfer duration from an entry point (e) to an exit point (s) for a respective data packet (P); He(p) is a first time stamping in a ticket associated with the respective data packet (P) by one of said probes at the entry point; and Hs(P) is a second time stamping in the ticket associated with the respective data packet (P) by said one of said probes at the exit point.

\* \* \* \* \*